United States Patent [19]

Korthuis et al.

[11] Patent Number: 4,974,404
[45] Date of Patent: Dec. 4, 1990

[54] APPARATUS AND METHOD FOR ADJUSTING A HARVESTER TO AN OBLIQUE PROFILE OF CANE TYPE BERRY PLANTS

[76] Inventors: Donald L. Korthuis, 606 Cascade Ct.; Scott A. Korthuis, 856 Garden Dr., both of, Lynden, Wash. 98264

[21] Appl. No.: 355,637

[22] Filed: May 23, 1989

Related U.S. Application Data

[63] Continuation-in-part of Ser. No. 302,588, Jan. 25, 1989, abandoned, which is a continuation-in-part of Ser. No. 202,116, Jun. 3, 1988, abandoned, which is a continuation-in-part of Ser. No. 875,631, Jun. 18, 1968, Pat. No. 4,750,322.

[51] Int. Cl.$^5$ .............................. A01D 46/28
[52] U.S. Cl. ...................... 56/330; 56/328.1
[58] Field of Search ............. 56/328.1, 330, 331, 56/233, 29, DIG. 19, 340.1

[56] References Cited

U.S. PATENT DOCUMENTS

| | | | |
|---|---|---|---|
| 2,447,122 | 8/1948 | Horst, Jr. | 56/330 |
| 3,184,908 | 5/1965 | Rust | 56/330 |
| 3,473,311 | 10/1969 | Fox | 56/330 |
| 3,494,117 | 2/1970 | Waygandt et al. | 56/330 |
| 3,596,457 | 8/1971 | Van Tine | 56/330 |
| 3,827,222 | 8/1974 | Toti | 56/330 |
| 3,890,774 | 6/1975 | Bruel | 56/330 |
| 4,063,406 | 12/1977 | Burton | 56/330 |
| 4,085,572 | 4/1978 | Bruel | 56/330 |
| 4,179,873 | 12/1979 | Scudder | 56/330 |
| 4,292,792 | 10/1981 | Burton | 56/330 |
| 4,383,400 | 5/1983 | Mead et al. | 56/233 |
| 4,435,950 | 3/1984 | Deux et al. | 56/330 |
| 4,538,406 | 9/1985 | Littau | 56/330 |
| 4,771,594 | 9/1988 | Deux et al. | 56/330 |

Primary Examiner—Stephen J. Novosad
Assistant Examiner—David J. Bagnell
Attorney, Agent, or Firm—Hughes & Multer

[57] ABSTRACT

An agricultural harvester for rowed crops, such as berry bushes, includes a wheeled chassis having an enclosure formed by a pair of upstanding fore and aft extending sidewalls. The harvester is driven in a manner that the berry bushes enter the front of the enclosure and exit from the rear. A stabilizing and displacing assembly is located toward the front of the enclosure to dislodge the fruit from the bushes when the bushes are within the enclosure, and to minimize any dislodging of fruit forward or rearward of the enclosure. The fruit is dislodged by a side-to-side transverse movement of the bush which is caused by a set of middle displacing rods. The bush is stabilized by forward and rearward stabilizing rods which act in opposition to the middle displacing rods. Such rods are independently adjustable at upper and lower ends thereof toward and away from the bushes.

13 Claims, 13 Drawing Sheets

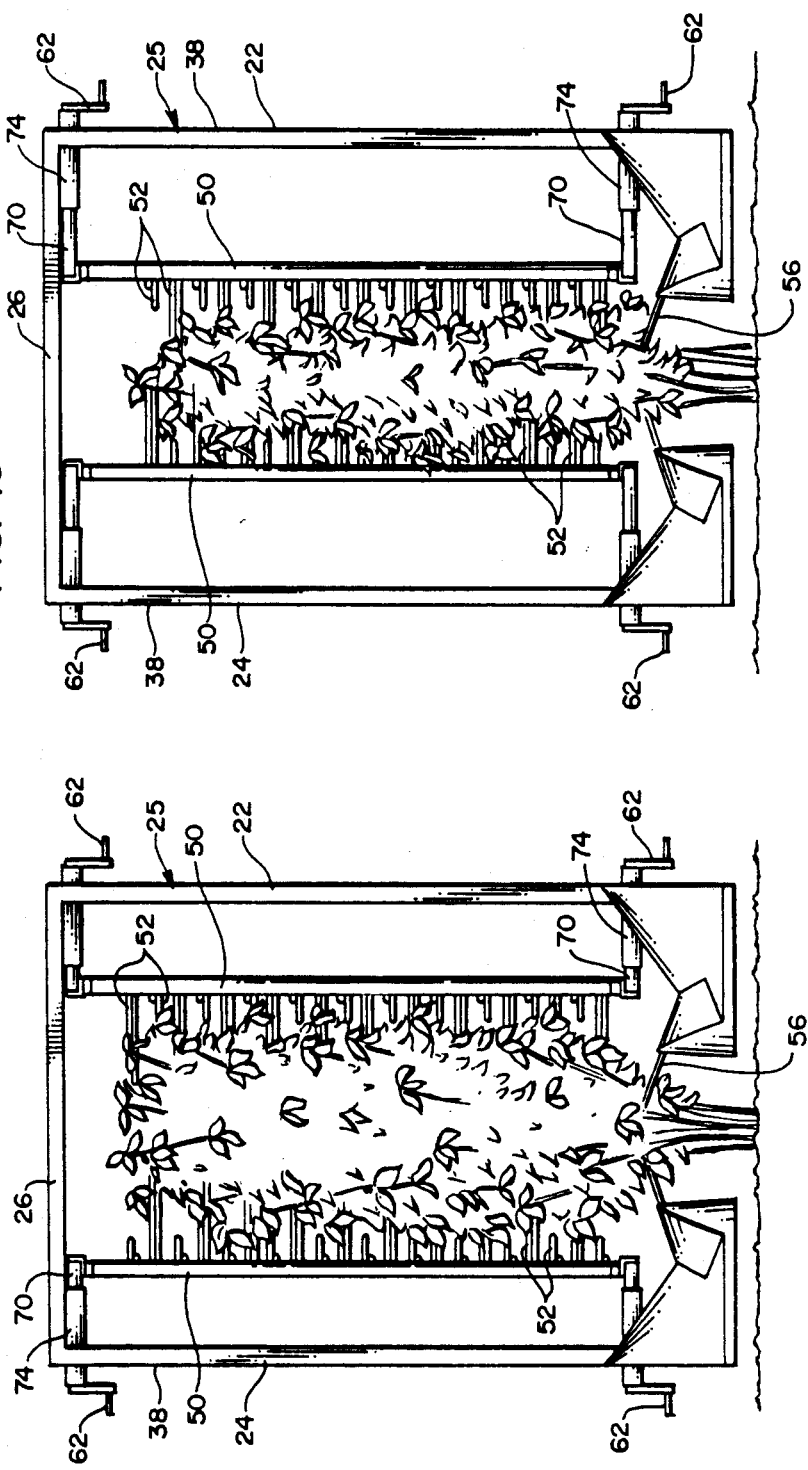

APPARATUS AND METHOD FOR ADJUSTING A HARVESTER TO AN OBLIQUE PROFILE OF CANE TYPE BERRY PLANTS

CROSS-REFERENCE TO RELATED APPLICATIONS

This application is a continuation-in-part application of a pending U.S. patent application Ser. No. 302,588, filed on Jan. 25, 1989 now abandoned; which is a continuation application of a U.S. patent application Ser. No. 07/202,116, filed on June 3, 1988, now abandoned; which is a continuation application of a U.S. patent application Ser. No. 875,631, filed on June 18, 1986, entitled "APPARATUS AND METHODS FOR DISLODGING AND COLLECTING PRODUCE FROM UPSTANDING CROPS" which was issued as U.S. Pat. No. 4,750,322.

TECHNICAL FIELD

The present invention relates to apparatus and methods for dislodging and collecting produce from produce bearing plants, and more particularly to apparatus and methods for dislodging and collecting berries from berry bushes which are planted in rows.

BACKGROUND OF THE INVENTION

The harvesting of fruit, such as berries, from fruit bearing bushes and vines which are planted in rows, involves a number of practical and economic considerations. First, there is a requirement that the berries be harvested as quickly as possible. A typical berry harvesting season may last four to six weeks. When the berries ripen, there is a short time span in which they must be picked or they will overripen and become unmarketable. Sometimes this requires that the berries be harvested every other day during the harvesting season so that it is not uncommon for a bush to be harvested twelve to eighteen or more times in a single season. To accomplish this within the allotted time, the harvesting operations must be expeditious.

In addition to picking speed, it is desirable that only those berries which are in fact ripe be dislodged from the bushes. However, as just mentioned, the fruit on many berry plants does not ripen at the same time. Any unripe fruit which is dislodged during a picking therefore reduces the overall yield of the bush.

With the rise in cost of manual picking, an increasingly greater share of the berry picking is being done by machinery. These machines are commonly mounted on a wheeled chassis and include an enclosure formed by two spaced apart upstanding sidewalls which extend in a parallel fore and aft direction. They also include a number of mechanically driven beater rods which strike at the bushes in order to dislodge the berries when the bushes are inside the enclosure. At the bottom of the sidewalls is a collecting floor including a collecting conveyor which collects the berries as they fall from the bushes and transports them to a collecting area.

To optimize yields, it is desirable that the berries be collected in a manner that the loosely held ripe fruit is dislodged from the bushes, while the more tightly held unripe fruit remains on the bushes to ripen. With berry bushes, however, many of the berries grow on long laterally extending fruit spurs which grow outwardly from the bush, but which constitute new growth and therefore are somewhat fragile and subject to easily breaking off. However, a dislodging force which is not sufficient to dislodge an unripe berry from the fruit spur, may be sufficient to break off the fruit spur from the bush, resulting in the loss of those unripe berries. Thus, the harvesting of berries is a tradeoff between speed of harvesting versus damage to the berry bush and resulting decreasing yield. That is, in a conventional operation, greater harvesting speed is often achieved by increasing the speed and impact force of the beater rods upon the bushes in order to increase the rate at which the berries are dislodged. The greater speed and impact of the beater rods, however, causes many of these fruit spurs to be broken off from the bushes and thereby decreases the overall fruit yield of the bush.

Various harvesters try to optimize harvesting yields by adjusting the amplitude and frequency of the striking motion of the beater rods. This has proved partially successful because it allows adjustment of the striking force imparted to the plants.

Additionally, the spacing and the position of the beater rod units has been adjusted in various ways. Commonly, the spacing between two beater elements which surround the plants is adjusted laterally. This helps the harvester to respond to variations in the thicknesses of plants which occur in the course of a harvesting season. It was thought that the combination of adjusting beater amplitude and frequency and lateral spacing sufficiently provided enough adjustment to optimize harvesting yields.

As indicated above a factor instrumental in the harvesting of berries is the maximization of the collection yield of berries which have been dislodged from the bushes. Collection of these berries by the berry picking machines is typically performed by the collecting plates which are located on the floor of the machine. In conventional berry picking machines, some of the fruit is dislodged from the bushes both in front and behind the machine and therefore is not collected within the enclosure. This is a result of the bushes being closely engaged in longitudinally extending rows so that movement of the bush by the beater rods within the harvester enclosure is transmitted or "telegraphed" forwardly and rearwardly from the machine to those bushes outside the enclosure. The resulting movement of the bushes outside the harvester enclosure not only causes those unpicked ripe berries in front of the machine to be dislodged and fall to the ground where the machine is unable to collect them, but it can cause those ripe berries which are still attached to the bushes behind the machine to fall to the ground.

Other conventional apparatus and methods for harvesting fruit have been disclosed. For example, a harvester having reciprocating elements is disclosed in U.S. Pat. No. 3,686,842 and U.S. Pat. No. 3,685,264, both by Littau. Harvesters having (i) vibrating beater elements are shown in U.S. Pat. No. 3,485,027 by Ganger; (ii) rotating beater elements are shown in U.S. Pat. No. 3,245,211 by Weygandt et al; (iii) beater elements with different phases are shown in U.S. Pat. No. 3,939,629 by Bruel; and (iv) adjustable variable angle beater elements are shown in U.S. Pat. No. 4,435,950 by Deux et al.

In addition to the aforementioned harvesting machines, harvesters having beater elements which are mounted to movable upstanding posts have been disclosed. These include laterally and/or angularly adjustable posts as shown in U.S. Pat. No. 3,184,908 by Rust;

U.S. Pat. No. 3,473,311 by Fox; U.S. Pat. No. 3,890,774 by Bruel; as well as U.S. Pat. No. 4,022,001; U.S. Pat. No. 4,292,792; and U.S. Pat. No. 4,063,406, all by Burton. Furthermore, spring biased laterally movable beater support posts are disclosed in U.S. Pat. No. 3,478,501 by Patzlaff; and U.S. Pat. No. 4,114,463 by Garden et al.

To supplement the foregoing prior art, the following patents are added:

U.S. Pat. No. 4,771,594 (Deux et al shows a berry harvester which passes rows of plants between offsetting sets of vertically spaced, longitudinally arrayed beater rods. The sets of rods 11 oscillate, beating together and apart like gates. The rods 11, which are arc shaped and which curve inwardly, are formed of a material which is flexible and deformable. In this way, they press against and hug the plant to conform to the plant's profile as it passes through the machine.

U.S. Pat. No. 4,538,406 (Littau) shows a beater rod driving component 40 mounted for forward and rearward slideable movement on a beam 34 in FIG. 2, forward and rearward adjustment of which moves the arcs of opposing beater rods 26 and 28 in a mirror-image relationship inwardly and outwardly relative to a row of plants.

U.S. Pat. No. 4,383,400 (Mead et al) shows a grapevine positioning apparatus which rather than using beater rods brushes grapevines with brushes for purposes of positioning the grapevines. These bushes tilt forwardly and rearwardly.

U.S. Pat. No. 4,085,572 (Bruel) adjusts the width of the space through which the plants pass by attaching sets of beaters 2 to resilient return means 15 which tends to close the sets of beaters inwardly.

U.S. 3,827,222 (Toti) shows a fruit harvester with picking units 26 etc. Each unit 26 has plurality of picking arms and surrounds the bushes on either side and above. The units are mounted for lateral, in and out, and vertical, up and down, adjustment.

U.S. Pat. No. 3,596,457 (Van Tine et al) shows a fruit harvester in which the frame is laterally adjustable.

U.S. Pat. No. 3,494,117 (Weygandt) shows beater tubes which are laterally adjustable in relation to the plants.

Other harvesters having laterally extending beater elements mounted to upstanding posts for horizontal and vertical movement are disclosed in U.S. Pat. No. 3,727,388 by Smith; and U.S. Pat. No. 4,251,893 by Burton. In U.S. Pat. No. 4,282,705 by Fontan, the beater elements are inclined from the horizontal. In Patzlaff, U.S. Pat. No. 3,611,689, two sets of beater elements are shown, one set being staggered longitudinally behind the other set of beater elements. Two pairs of longitudinally separated beater elements are also shown in U.S. Pat. No. 4,251,983 by Burton.

Additional harvesting machines are also disclosed in U.S. Pat. No. 2,671,301 by Harrison; U.S. Pat. No. 3,768,240 by Lyon; U.S. Pat. No. 2,447,122 by Horst, Jr.; and U.S. Pat. No. 4,445,316 by Browning et al.

SUMMARY OF THE INVENTION

The present invention pertains to an agricultural harvester for crops which are planted in rows. The harvester includes a frame which is mounted on a wheeled chassis and which includes a harvesting enclosure which is open at the front and rear. The harvester is driven along the crop rows so that a portion of the crop row enters the front of the enclosure between the sidewalls and exits from the rear.

In order to remove the fruit from the bushes, a crop dislodging assembly is operatively connected to the frame inside of the harvester enclosure. The crop dislodging means includes crop displacing means for moving the middle part of the crop row portion in a generally transverse side-to-side manner. The crop displacing means includes first and second transversely spaced apart displacing elements which are adapted to engage the first and second sides of the middle part of the crop row portion therebetween. The crop dislodging means also includes crop stabilizing means which are located forward of the crop displacing means and which limit movement of the forward part of the crop row portion in the side-to-side direction. The forward crop stabilizing means includes first and second transversely spaced apart stabilizing elements which are adapted to engage the first and second sides of the forward part of the crop row portion therebetween. The harvester also includes crop dislodging and stabilizing drive means including motor means which are operatively connected to the crop dislodging means in a manner to cause (i) the first displacing elements to move in a first general transverse direction in engagement with the first side of the crop row portion so as to cause the middle part of the crop row portion to move in the first transverse direction, (ii) the second stabilizing elements of the forward stabilizing means to move in engagement with the second side of the crop row portion in a second transverse direction which is generally opposite to the first transverse direction to oppose movement of the forward part of the crop row portion in the first transverse direction, and (iii) the first stabilizing elements to move in cooperation with the second stabilizing elements in the second transverse direction to a location where the first stabilizing elements have a substantial alignment component which is parallel to the longitudinal axis of the enclosure so as to engage the second side of the crop row portion forward part in order to inhibit movement of the forward part of said crop row portion in the second transverse direction.

In an exemplary embodiment the crop dislodging assembly includes front and rear stabilizing means, and middle displacing means. The stabilizing and displacing means include left, right upstanding support posts which are adjustable transversely inward and outward within the enclosure; and a plurality of horizontally extending flexible rods which are connected to the upstanding support posts. The support posts are rotated about their upstanding axes by a drive assembly in a manner that while the middle displacing rods cause a middle portion of the bush to be displaced from side-to-side within the enclosure in order to dislodge the fruit, the front and rear stabilizing elements move in opposition to the middle displacing elements to stabilize the front and rear parts of the bush in the enclosure. This reduces the amount of fruit dislodged from the bushes forward and rearward of the harvester enclosure. As the fruit falls to the floor of the harvester enclosure, it is directed sideways to a rearwardly traveling conveyor which transports the fruit to a rear collecting station.

For independent adjustment of the upstanding posts, an apparatus is provided having the following elements:

A mobile support frame having a crop receiving region for the passage of crops; first and second crop harvesting units positioned on opposite sides of the crop receiving region; and first and second mounting means by which the first and second harvesting units are, respectively, mounted to the support frame. Each of the harvesting units includes the support posts mounted for rotation about their vertical axis and harvesting rods means mounted thereto. The first and second mounting means are laterally adjustable in that upper and lower portions of each of the posts means can be independently moved laterally toward and away from the crop receiving region, whereby angular orientation and laterally spacing of each of the post means can be independently controlled.

Each of the vertical posts means is mounted for limited back and forth rotational movement about its vertical axis, being driven back and forth by a drive means, with the beater rod means moving laterally into engagement with the crops and laterally away therefrom. A drive means which drives the back and forth movement of the post means is adjustable whereby angular movement of the post means can be controlled for greater or lesser increments of rotational travel of the post means.

The mounting means comprises upper and lower mounting means with independent movement: the upper mounting means engages an upper portion of its related post means, the upper mounting means being laterally adjustable to move the upper end of its related post means inwardly and outwardly from the crop receiving region; the lower mounting means is laterally adjustable whereby a lower end of related post means can be moved laterally toward and away from the crop receiving region independently from the upper mounting means. The lower mounting means comprises hydraulic jack means. The upper mounting means comprises threaded actuating means engaging upper ends of each of the post means in a manner that rotation of the threaded actuating means causes inward and outward lateral movements of the upper ends of both of the post means.

By permitting precise positioning of the upper and lower ends of vertical harvesting elements, independently toward and away from the plants in the row, the present invention precisely positions the harvesting elements in relation to lateral fruit spurs and other fragile parts of the plants. This enhance the yield of the harvest, while allowing increased efficiencies.

It is an object of the present invention to provide apparatus and methods for collecting produce from plants in a manner to obtain an improved yield of the produce at greater picking rates and to minimize damage to the plants.

BRIEF DESCRIPTION OF THE DRAWINGS

These and other objects and advantages of the present invention will become more readily apparent upon reading the following Detailed Description and upon reference to the attached Drawings in which:

FIG. 15 is a front view of the harvesting apparatus and showing a selected transverse separation of the support posts and the stabilizing and displacing rods early in a harvesting season when the berry bushes have a wider diameter;

FIG. 16 is a front view, similar to FIG. 15, and showing the support posts and rods in a selected closer relationship to engage a berry bush later in the harvesting season.

Figure 1:
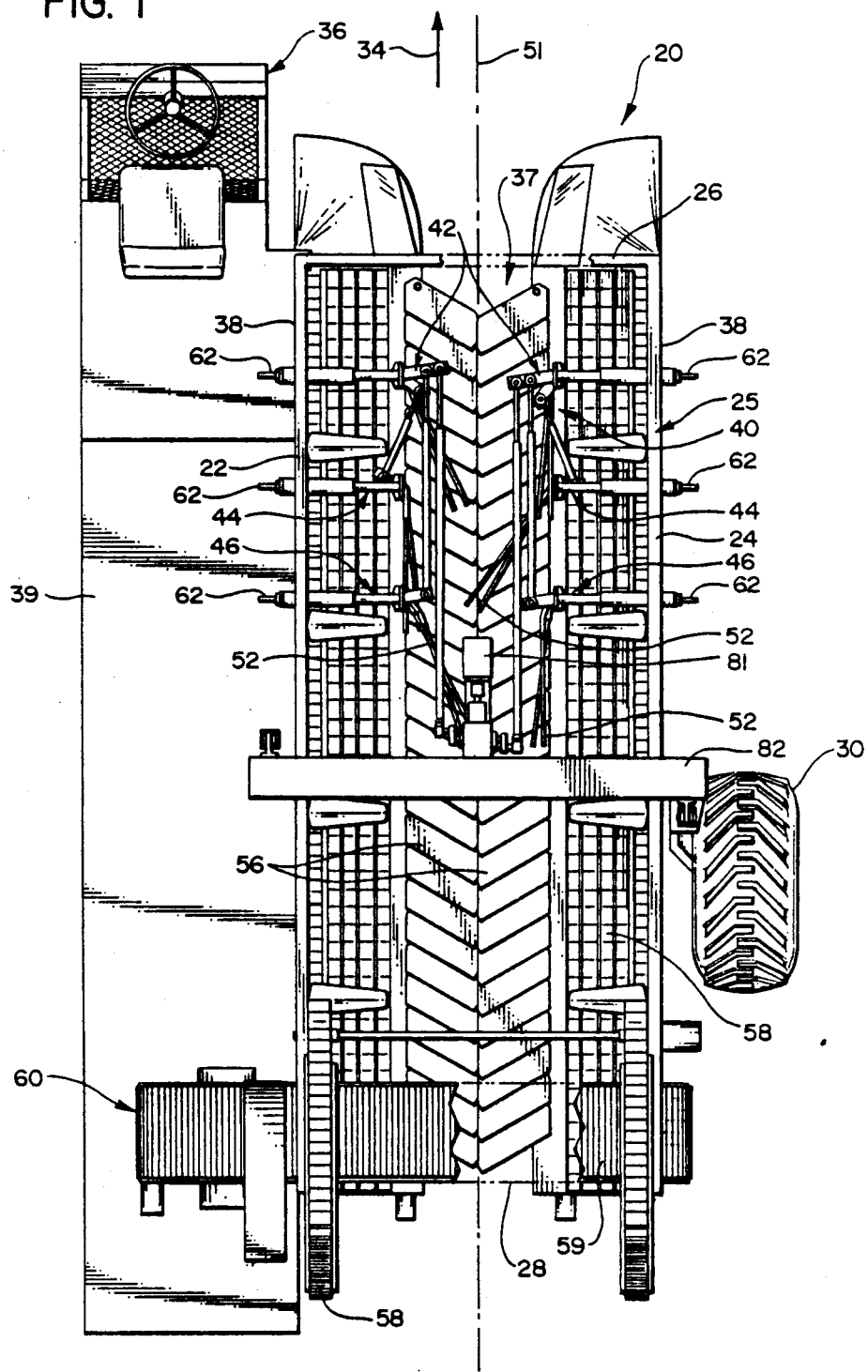
FIG. 1 is a top view of the harvesting apparatus of the present invention.
Figure 2:
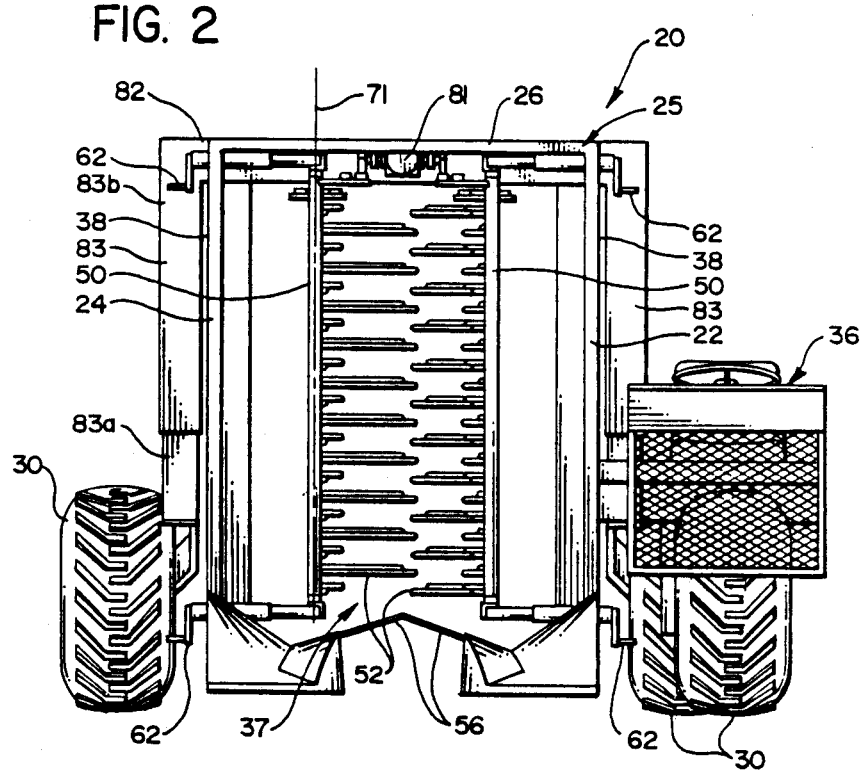
FIG. 2 is a front view of the harvesting apparatus of the present invention.
Figure 3:
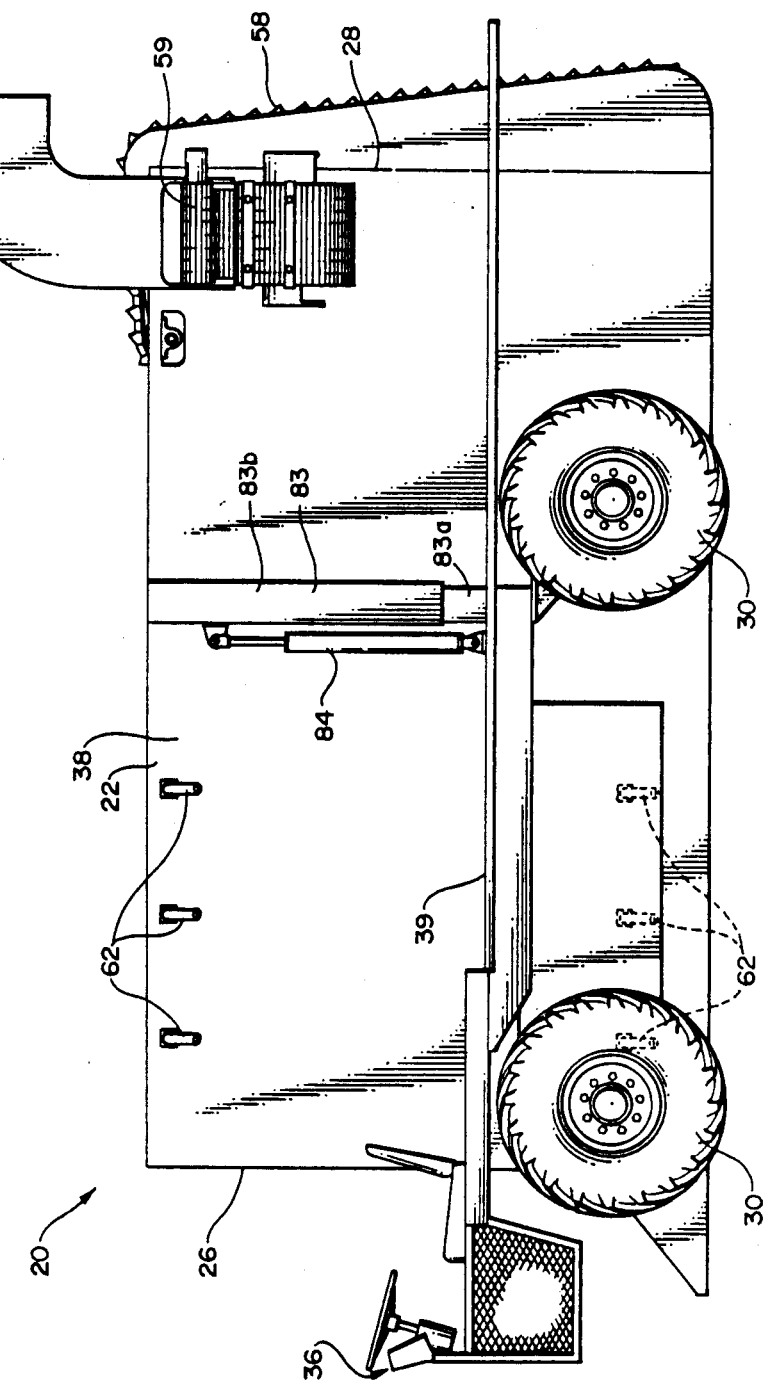
FIG. 3 is a left side view of the harvesting apparatus.
Figure 4:
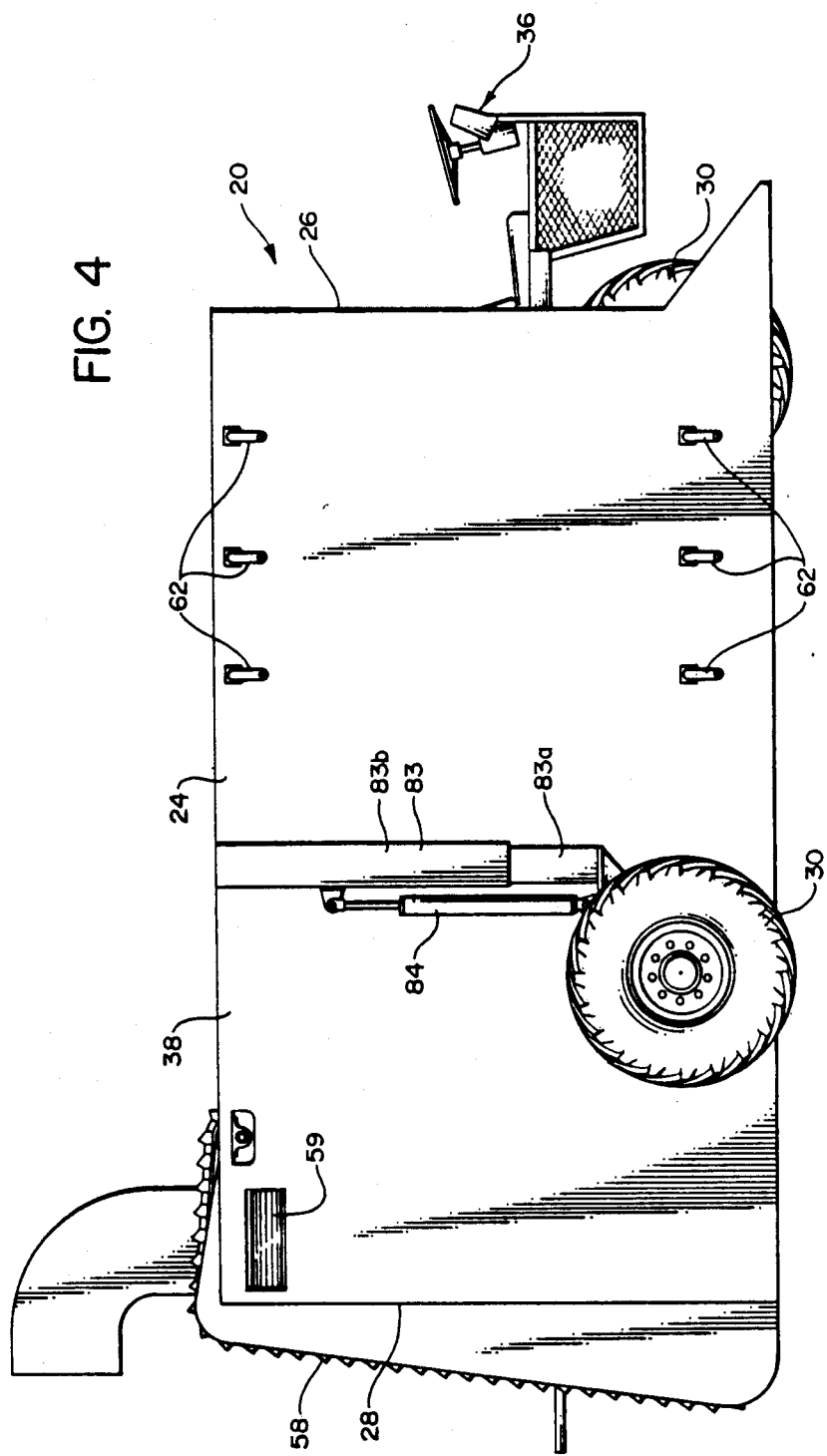
FIG. 4 is a right side view of the harvesting apparatus.

While the present invention is susceptible of various modifications and alternative form, specific embodiments thereof have been shown by way of example in the Drawings and will herein be described in detail. It should be understood, however, that it is not intended to limit the invention to the particular forms disclosed, but on the contrary, the invention is to cover all modifications, equivalents and alternatives falling within the spirit and scope of the invention as expressed in the appended claims.

DETAILED DESCRIPTION OF THE INVENTION

The present invention pertains to a machine for harvesting fruit, and in particular to a machine for harvesting berries from bushes which are commonly grown in rows, and where the berry bushes are sometimes supported between upstanding trellises or the like by a number of horizontal supporting wires which extend between the bushes from one trellis to another.

Before proceeding with a detailed discussion of the invention, the principal elements and their operation will be described first. Referring to FIGS. 1 through 4, a harvesting machine, generally indicated at 20, includes a frame having a left side 22, a right side 24, a front 26 and a rear 28. The frame is supported by wheel assemblies 30 for movement in a forward direction indicated by an arrow 34. The harvester is propelled by an internal combustion engine (not shown) in response to commands from an operator seated at the left front portion of the harvester and behind a steering wheel and control panel indicated at 36. The frame includes (i) a pair of upstanding sidewalls 38 which extend in a longitudinal fore and aft direction and which form an enclosure indicated at 37 which is open at the front 26, rear 28 and at the top, and (ii) a work station platform 39 which is mounted at the left side of the frame. In operation, the harvester is steered along a row of bushes in a manner shown in FIGS. 15 and 16, so that the bushes enter the front 26 of the harvester enclosure, and exit from the rear 28.

In order to dislodge the berries, a bush stabilizing and displacing assembly, generally indicated at 40 in FIG. 1, is located near the front of the harvester enclosure. The stabilizing and displacing assembly 40 includes front and rear stabilizing means, indicated at 42 and 46, respectively, and middle displacing means 44. It should be appreciated that the front and rear stabilizing means 42, 46 and middle displacing means 44 have somewhat similar structures, however their operation and functions differ as their names imply, in a manner to be described further hereinafter.

Each of the displacing means includes left, right vertical upstanding posts 50 (FIG. 2) which are moveably mounted to the frame inward of left, right sidewalls 38, respectively, and which have flexible horizontally extending rods 52 which are rigidly mounted to the upstanding posts 51. For ease of discussion, the enclosure 25 is divided longitudinally by an imaginary centerline 51 as shown in FIG. 1, into left, right portions. Furthermore, the term "inward" refers to a transverse direction toward centerline 50 and "outward" refers to a transverse direction away from centerline 51.

As the harvester travels in the forward direction, support posts 50 are caused to rotate about their respective upstanding longitudinal axes. This in turn causes the rods 52 to move in a general side-to-side direction which has a substantial transverse alignment component and a smaller longitudinal alignment component, thereby causing the bushes inside the enclosure 37 to be swayed in a corresponding direction. This side-by-side swaying action, which is quite vigorous, dislodges the ripe berries from the bush. As the berries are dislodged, they fall downwardly onto a plurality of lower, substantially horizontal conventional collection plates 56 which extend somewhat upwardly at their inward ends to form an inverted "V" configuration. Collecting plates are spring biased to the position shown in FIG. 1 However, when they engage the trunk of a bush, collecting plates 56 are caused to rotate rearwardly and outwardly about respective pivot connectors mounted to their inward ends to allow the trunk to proceed through enclosure 37. Upon landing on the collecting plates, the berries travel outwardly and downwardly into left, right fore-and-aft travelling endless conveyors 58 which carry the berries to the rear of the harvester and then upwardly where they are unloaded onto a rear conveyor 59 which operates in a transverse direction and which transports the berries to a collecting station indicated at 60 where the berries are unloaded.

It is a feature of the present invention to overcome the deficiencies of conventional harvesters, some of which are described in the Background of the Invention. To this end, the harvester of the present invention is adapted to variably position the stabilizing and displacing assembly 40 in a manner that the rods 52 "hug" the bush, throughout their side-to-side movement. Therefore instead of slapping or impacting the bush as in conventional apparatus, the rods 52 remain substantially in contact with the bush throughout their operational cycle. This is achieved by moving the upstanding support posts 50 transversely within the enclosure and into close engagement with the bushes by means of handcranks 62 which are located on the outer sides of the sidewalls 38.

A further feature of the present invention is the operation of the bush stabilizing and displacing assembly 40 in a manner that (i) the stabilizing rods 52 of the front and rear stabilizing means 42, 46 operate to stabilize the bush, and (ii) the displacing rods 52 of the middle displacing means 44 operate to primarily achieve the aforementioned side-to-side displacing movement of the bush. This stabilizing effect is achieved in part by the side-to-side movement of the front and rear stabilizing rods 52 through a smaller arcuate path than that of middle displacing rods 44. In addition, while the stabilizing rods 52 of the front and rear stabilizing means 42, 46 operate together in phase, the displacing rods 52 of the middle displacing means 44 operate 180° out of phase with the front and rear displacing rods. Thus, while the bush travels rearward through the enclosure of the harvester, the middle portion of the bush is subjected to substantial side-to-side dislodging movement by the middle displacing means 44, while the front and rear portions of the bush within the enclosure are inhibited from any substantial side-to-side movement. By the opposing action of the front and rear stabilizing means, the number of berries which are dislodged from the bushes both forward and rearward of the harvester enclosure due to the aforementioned "telegraphing action" is reduced.

Figure 5:
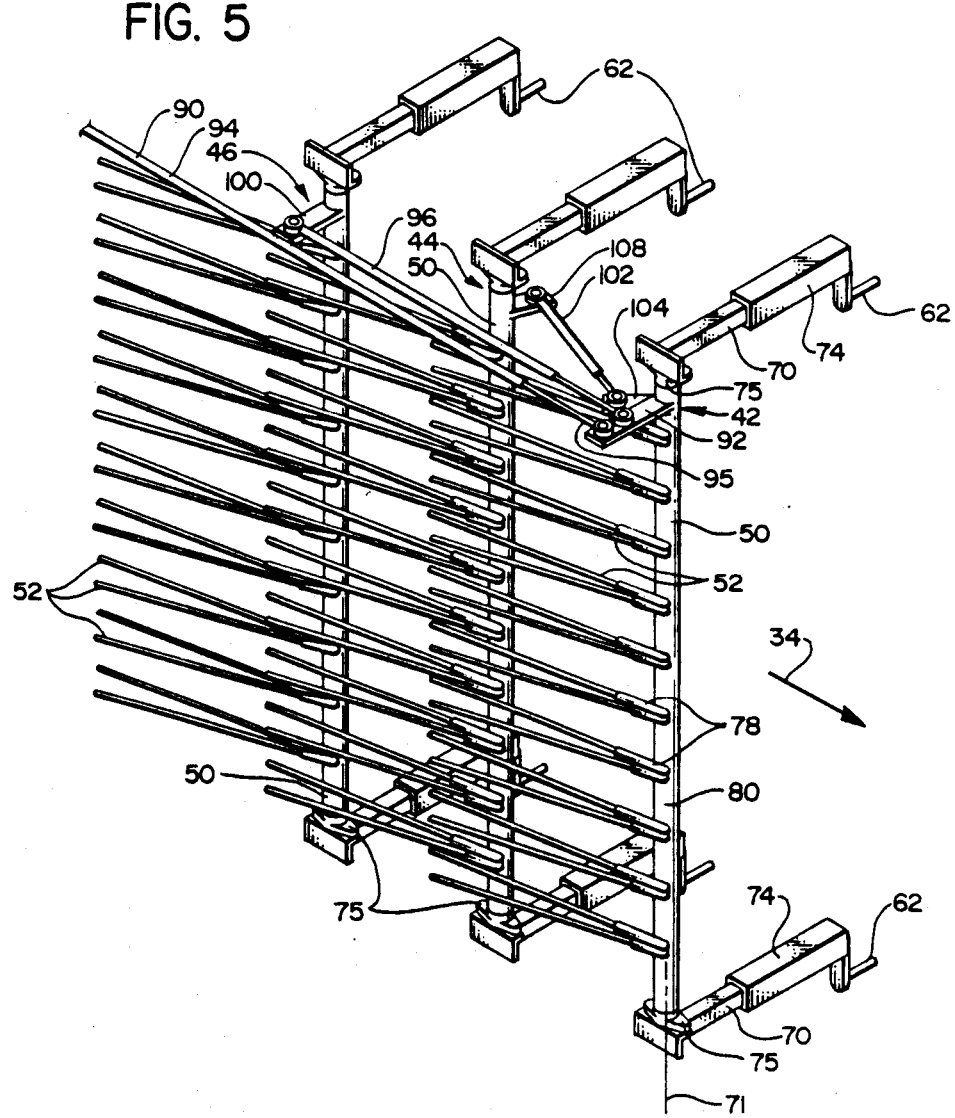
FIG. 5 is an isometric view of the left portion of the stabilizing and displacing assembly which is connected to the left side of the harvesting apparatus.

Having described the principal elements of the present invention and their operation, these elements and the remaining elements of the harvester 20 will be described in greater detail. Shown more clearly in FIG. 5 are the left front and left rear stabilizing means 42 and 46, and the left middle displacing means 44. It should be appreciated that the left side of the stabilizing and displacing assembly 40 is identical to the right side, which is not shown in FIG. 5 for clarity. In FIG. 5, each upstanding support post 50 is pivotally mounted at its top and bottom to upper, lower transversely extending horizontal sleeves 70, for pivotal movement about respective upstanding rotational axes designated by a line 71. To achieve optimum displacing and stabilizing operation, each of the upper, lower sleeves 70 is slidably engaged within an outer housing 74 which in turn is rigidly mounted to and extends through a respective sidewall 38 at the upper and lower portions of the sidewall. Transverse movement of sleeve 70 within the housing 74, is achieved by the manual operation of the corresponding handcrank 62 which is rotatably mounted to the housing 74 outside of the harvester enclosure. The handcrank 62 is rigidly connected to a threaded screw, such as an Acme threaded screw. The Acme screw extends within housing 74 and threadably engages a female threaded portion of sleeve 70 in a manner that rotation of the Acme screw within the sleeve 70 causes axial movement of the sleeve 70 on the screw transversely within the harvester enclosure. To support the upstanding support posts 50 for rotational movement on the sleeves 70, the inward ends of the sleeves include brackets 75 having cylindrical vertical slots (not shown) which receive the upper, lower ends of the posts 50 therein for rotation about axes 71.

In order to closely engage the berry bush as it travels through the harvester enclosure 37, the rods 52 (FIG. 5) are rigidly mounted at their inner proximal ends to the support posts 50 by means of horizontal holder tubes 78 which in turn are rigidly mounted to the inward surfaces 80 of the upstanding support posts 50. Efficient displacing and stabilizing action is achieved by mounting the rods 52 in pairs between the upper and lower portions of the support posts 50 in a manner that each paired set of rods 52 extend somewhat horizontally from the support posts 50. In order to improve displacing and stabilizing action, the rods 52 of each paired set diverge horizontally from posts 50 by several degrees.

The displacing and stabilizing assembly 40 (FIG. 1) is driven by means of a hydraulic motor 81 which is rigidly mounted to a transversely extending cross member 82 by means of a forwardly extending support bar (not shown). Cross member 82 is supported above the upper edges of sidewalls 38 by means of downwardly depending support struts 83 (FIG. 2) which are connected to the sidewalls 38, and which include inner and outer axial sleeve portions 83a, 83b, respectively. The inner support struts 83a in turn are connected to the rear wheel assemblies 30. To allow the harvesting enclosure 37 to be raised and lowered relative to the ground, conventional hydraulically actuated left, right piston/cylinder assemblies 84 (FIGS. 4 and 5) are connected to the strut outer sleeve portions 83b and to the wheel assemblies 30.

Figure 6:
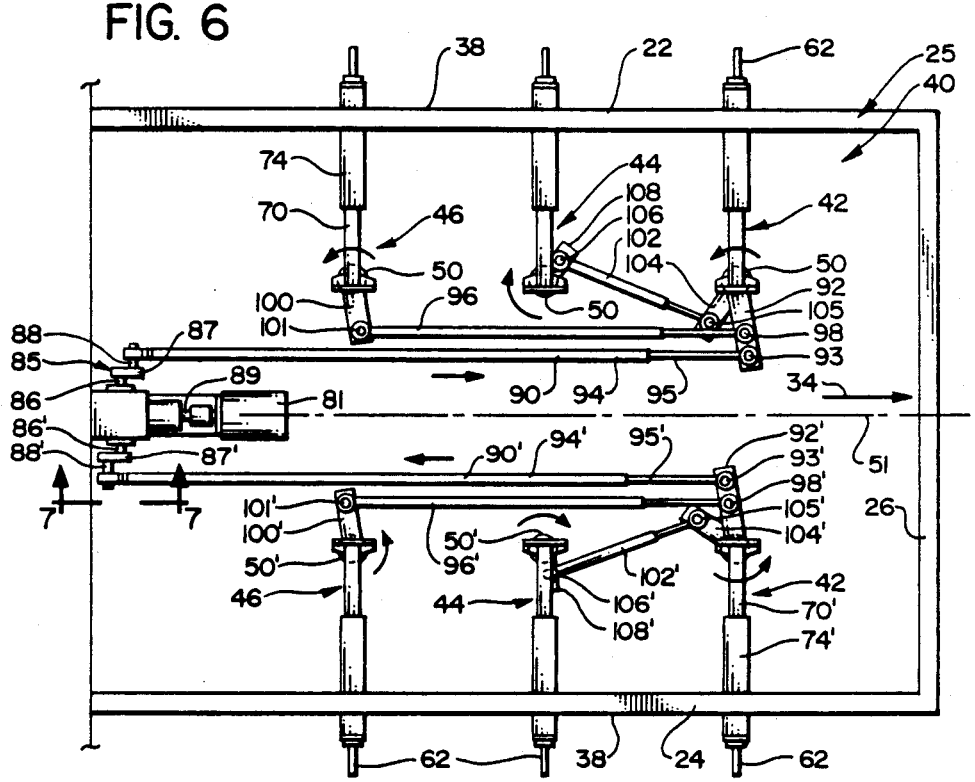
FIG. 6 is a top view of the stabilizing and displacing assembly drive mechanism in a first drive position.

As shown more clearly in FIG. 6, the stabilizing and displacing assembly drive motor 81 is operatively connected to a transversely extending crank shaft, indicated at 85, by means of drive shaft 89. For clarity in discussing the displacing and stabilizing assembly 40, the corresponding elements on the right side of the enclosure will be designated by like numerals with a prime (') symbol attached. The crank shaft 85 includes left and right inward shaft portions 86, 86', respectively, which in turn are rigidly connected to the left and right end plates 87, 87' at eccentric locations on the end plates 86. In turn, each end plate 87 includes an outer eccentrically mounted transversely extending shaft portion 88 to which a fore-and-aft extending primary drive rod 90 is journalled. In order to achieve a reciprocating drive motion, the left outer shaft portion 88 is eccentrically mounted to the left end plate 87 in a manner 180° from the position which the right shaft portion 88' is mounted to the right end plate 87'. Thus, during rotation of crank shaft 85, when the left primary drive rod 90 is moved in a forward direction, the right primary drive rod 90' is moved in a rearward direction.

Pivotal movement of the forward support posts 50 about axes 71 and the side-to-side movement of the stabilizing rods 52 therewith is achieved by connection of the respective primary drive rods 90 to the inward ends of respective elongated transverse extension bars 92 by a pivot connector 93. Extension bars 92 in turn are rigidly connected to and extend inwardly from the upper and lower ends of the forward support posts 50. In order to adjust the rotational path of the rods 52 by varying the length of the primary drive rods 90, each drive rod 90 includes an outer sleeve portion 94 and an inner sleeve portion 95 which is axially slideably engaged within the outer sleeve portion 94. The position of each inner sleeve portion 95 relative to the outer sleeve portion 94 is fixed by a releasable fastener (not shown). Thus, lengthening of the left primary drive rod 90 causes the left forward support post 50 to be adjusted in a counterclockwise direction (when viewing FIG. 6), so that the path of the left front stabilizing rods 52 are moved somewhat inward. Likewise, decreasing the length of the left primary drive rod 90, causes the left support post 50 to be adjusted in a clockwise manner so that the path of the left forward stabilizing rods 52 are adjusted somewhat outward.

As mentioned previously, the stabilizing rods 52 of the front and rear stabilizing means 42, 46, rotate together in phase. That is, the longitudinal axes of the stabilizing rods 52 of the forward, rear stabilizing means 42, 46 remains substantially parallel throughout their pivotal movement about axes 71. This is achieved by left, right axially adjustable secondary drive rods 96 (FIG. 6) which are pivotally connected (i) at their forward ends to the left, right first extension bars 92, 92' by respective pivot connectors 98 which are located just outward from centerline 51 from the pivot connectors 93, and (ii) at their rearward ends by pivot connectors 101 to left, right third elongated extension bars 100, 100' which are rigidly mounted to the top of the left, right rear support posts 50, 50' in a manner that the third extension bars 100 are generally parallel to the first extension bars 92.

In order to achieve efficient displacing action of the bushes, the support posts 50 of the middle displacing means 44 are rotated through a greater arc than are the support posts 50 of the front, rear stabilizing means 42, 46. In a preferred embodiment, the stabilizing rods 52 of the front and rear stabilizing means 42, 46 travel through an arc of approximately 20° while the displacing rods 52 travel through an arc of approximately 29°. This is accomplished by left, right axially adjustable tertiary drive rods 102, 102' which include forward end portions which are connected by pivot connectors 105, 105' to left, right fourth extension bars 104, 104' which extend inwardly and rearwardly from support posts 50 of the front stabilizing means 42. The left, right extension bars 104, 104' are rigidly mounted to the forward left, right support posts 50 in a manner that the longitudinal axis of each extension bar 104 forms an angle of approximately 45° with the longitudinal axis of the first extension bar 92. The rear ends of the left, right tertiary drive rods 102 are connected by pivot connectors 106 to left, right fifth extension bars 108, 108' which extend from the upper portion of the support post 50 of the middle displacing means 44. The left fifth extension bar 108 extends primarily outward and somewhat forward from left middle support post 108, whereas the right extension bar 108' extends generally outward from the right middle post 50.

This arrangement generates a displacing and stabilizing action which is shown more clearly by referring to FIGS. 6 through 14. First, reference is made to FIGS. 6, 7 and 8, where the right outer shaft portion 88' of crank shaft 85 extends rearwardly at the nine o'clock position (FIG. 7) and the left outer shaft portion 88 extends forwardly at the three o'clock position. This places the left front and rear upstanding support posts 50 at positions of maximum counterclockwise rotational travel and the left front and rear stabilizing and displacing rods 52 so that they have moved in a rightward direction to a location where they extend primarily rearward and somewhat inward at about the eight o'clock position in FIG. 8. In addition, the right front and rear support posts 50 are at positions of maximum counterclockwise travel, with the right front and rear stabilizing rods 52 having moved rightward to a position where they extend primarily rearward.

The desired stabilization of the forward and rearward portions of the berry bush during side-to-side movement of the middle portion is achieved by the in phase movement of front, rear stabilizing rods 52 in a parallel manner. Thus, as can be seen by referring to FIGS. 8, 11 and 14, the aforementioned pivotal rotation of the left and right front support posts 50 and displacing rods 52, causes substantially identical pivotal rotation of the left and right support posts 50 and displacing rods 52 of the rear stabilizing means 46. This is due to the fact that the front and rear support posts 50 are linked by secondary drive rods 96 and by the fact that the front pivot connectors 98 and rear pivot connectors 101 are located at equal distances from the upstanding rotational axes 71 of the front and rear support posts 50.

Figure 7:
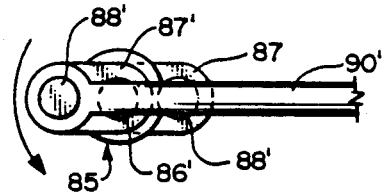
FIG. 7 is a side view of a portion of the drive mechanism in the first drive position including primary drive rods which are eccentrically mounted to a motor driven crank shaft.
Figure 8:
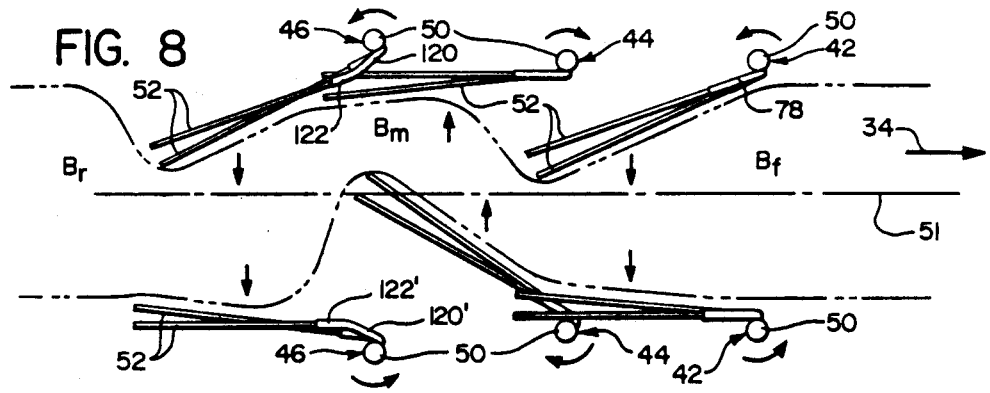
FIG. 8 is a top view of the stabilizing and displacing rods in the first position in solid lines and an outline of the position of the harvested bush in phantom.

In the first position shown in FIGS. 6 through 8, the left support post 50 of the middle displacing means 44 is at a location of maximum clockwise rotation. This positions the left displacing rods 52 so that they have moved in a left direction and they extend rearward in a manner generally parallel to centerline 51 at about the nine o'clock position. In addition, the right middle support post 50 of the displacing means 44 has reached its position of maximum clockwise travel. This positions the right displacing rods 52 so that they have moved leftward to a position where they extend inward and rearward between about the ten to eleven o'clock position. As a result of the leftward movement of the middle displacing rods 52, a corresponding leftward movement is transmitted to the middle portion $B_m$ of the bush as shown in FIG. 8. However, to stabilize the forward portion $B_f$ of the bush, the left stabilizing rods 52 of the forward displacing means 42 engage the left side of the bush and move it rightward in opposition to the leftward movement of the right middle displacing rods. In the first position shown in FIG. 8, an imaginary extension of the left forward stabilizing rods 52 intersects the right displacing rods 52 at an angle of about 70°. To engage the right side of the bush forward portion $B_f$ and to prevent movement of the bush forward portion in the rightward direction so as to prevent the bush from forming an "S" configuration, the right front stabilizing rods 52 do not pivot past a location where they are generally parallel to centerline 51. Therefore, while the left front stabilizing rods 52 are exerting an inward force against the left side of the bush forward portion $B_f$ in a rightward direction inside the enclosure, the right front stabilizer rods 52 are restraining the right side of the bush forward portion $B_f$ from moving to the right side of enclosure 37. This essentially stabilizes the bush forward portion $B_f$ about centerline 51. Similarly, the left stabilizing rods of the rear stabilizing means 46 move rightward within the enclosure in opposition to the aforementioned leftward movement of the bush middle portion $B_m$ and in a manner parallel to the front displacing rods 52. This helps to stabilize the rear portion $B_r$ of the berry bush before it exits from the rear of the harvester enclosure 37. Furthermore, the right rear stabilizing rods 52 extend in a primarily rearward and slightly inward direction to restrain the right side of the bush rear portion $B_r$ from moving to the right side of enclosure 37.

Figure 9:
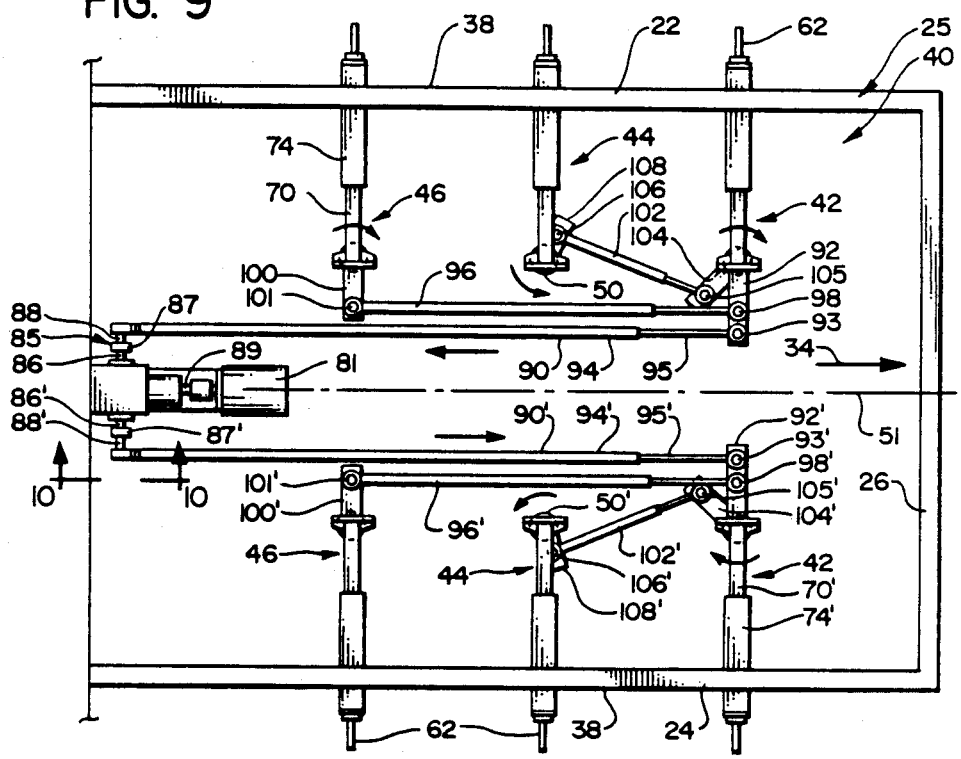
FIG. 9 is a top view of the assembly drive mechanism in a second drive position.
Figure 10:
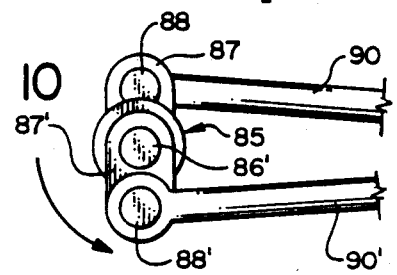
FIG. 10 is a side view, similar to FIG. 7, of a portion of the drive mechanism in the second position.
Figure 11:
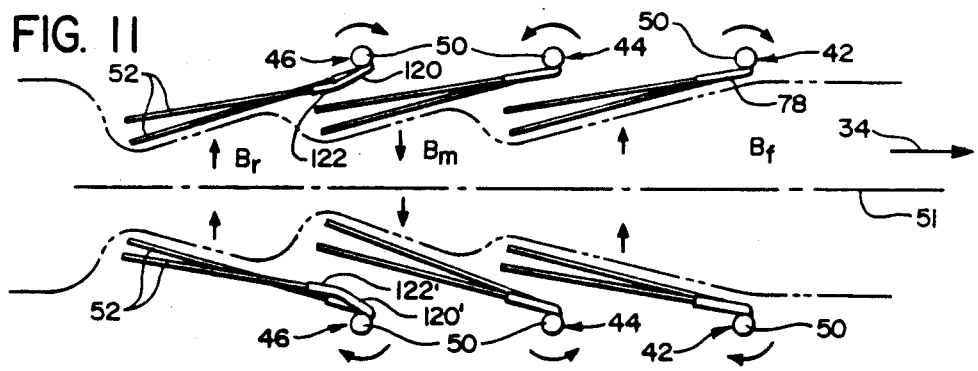
FIG. 11 is a top view of the stabilizing and displacing rods in the second position.

Continuing with a discussion of the operation of the displacing and stabilizing assembly 40, reference is made to FIGS. 9 through 11 where crank shaft 85 has rotated in a counterclockwise direction approximately 90° from its position shown in FIG. 7. In this second position, the left, right outer shaft portions 88, 88' extend upward and downward in the twelve o'clock and six o'clock positions, respectively. This in turn causes forward movement of the right primary drive rod 90, clockwise rotation of the right front support post 50 and left inward movement of the right stabilizer rods 52 of the forward stabilizing means 42. Likewise, rearward movement of the left primary drive rod 90 causes clockwise rotation of the left forward support post 50 and left outward movement of the left forward stabilizing rods 52. In the second position, the tips of the left, right stabilizing rods of the front stabilizing means 42 are generally equally spaced from centerline 51. Furthermore, the left, right secondary drive rods 96 cause the left, right stabilizing rods 52 of the rear stabilizing means 46 to move in a parallel manner to the left, right stabilizing rods 52, respectively, of the forward stabilizing means 42.

On the other hand, the aforementioned clockwise rotation of the left front support post 50 in turn causes a generally rearward and somewhat outward axial movement of the left tertiary drive rod 102 and counterclockwise rotation of the left middle support post 50. This in turn causes right inward movement of the left middle displacing rods 52 to a location where they are generally parallel to the left stabilizing rods 52 of the front and rear stabilizing means 42, 46 (FIG. 11). Movement of the right displacing rods 52 of the middle displacing means 44 in a right outward direction to a location where the middle displacing rods are parallel to the stabilizing rods 52 of the front and rear displacing means of the generally forward and somewhat inward axial movement of the right tertiary drive rod 102' so that right middle support post 50' is rotated in the clockwise direction. The aforementioned movement of the stabilizing and displacing rods 52, places the bush in a transition state where the middle portion $B_m$ of the bush is generally aligned with the front and rear portions.

Figure 12:
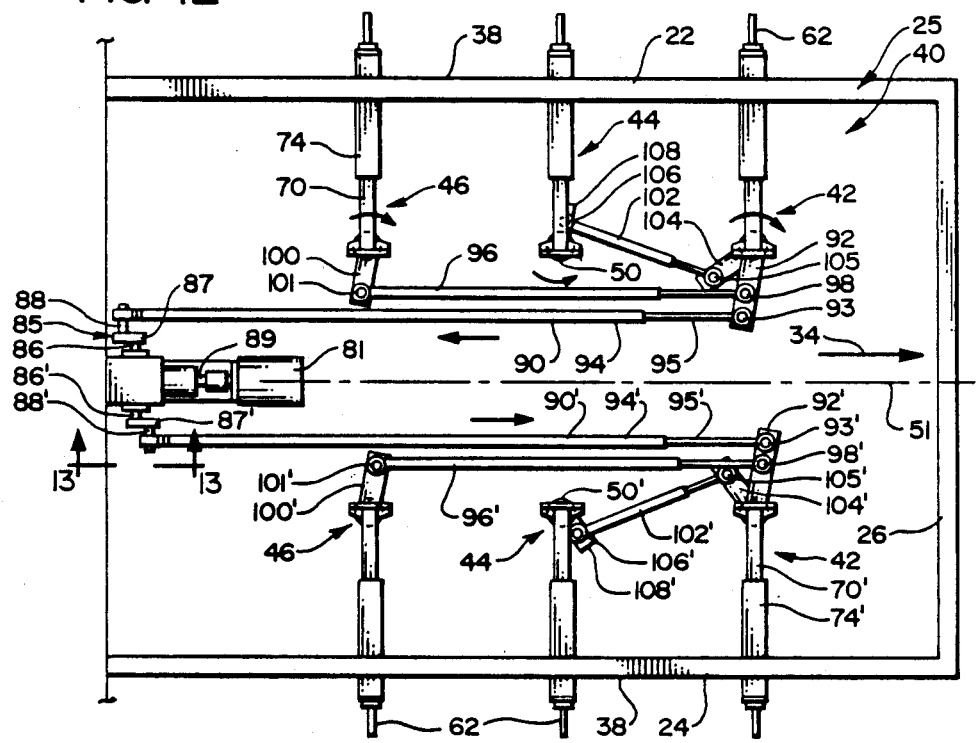
FIG. 12 is a top view of the assembly drive mechanism in a third position.
Figure 13:
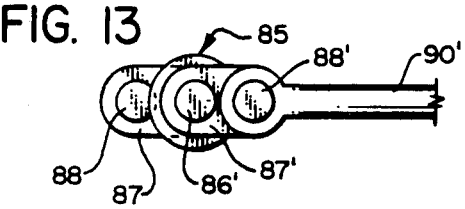
FIG. 13 is a side view, similar to FIGS. 7 and 10, showing a portion of the drive mechanism in the third position.

However, further 90° counterclockwise rotation of crank shaft 85 places the displacing and stabilizing assembly 40 in the third position shown in FIGS. 12 through 14. In this position, the right outer shaft portion 88' has moved forwardly to a three o'clock position shown in FIG. 13, and the left outer shaft portion 88 is moved rearwardly to a nine o'clock position. This causes the forward movement of the right primary drive rod 90' and clockwise rotation of the right front support post 50', as well as rearward movement of the left primary drive rod 90 and clockwise rotation of the left front support post 50. The aforementioned clockwise rotation of the left and right front support posts 50 causes (i) the left stabilizing rods 52 of the forward and rearward stabilizing means 42, 46 to rotate in a left outward direction to positions where they extend generally rearward, and (ii) the right stabilizing rods 52' of the forward and rearward stabilizing means 42, 46 to rotate in a left inward direction to the positions where they extend generally rearward and inward between about the ten o'clock and eleven o'clock positions.

At the same time, the clockwise rotation of the left forward support post 50 causes a generally rearward and somewhat outward axial movement of the left tertiary drive rod 102 which in turn causes counterclockwise rotation of the left middle support post 50 and right inward movement of the left displacing rods 52. Likewise, the clockwise rotation of the right front support post 50 causes counterclockwise rotation of the right middle support post 50 by means of the forward and somewhat inward axial movement of the right tertiary drive rod 102, and right outward movement of the right displacing rods 52 to a position where the right middle displacing rods 52 extend rearward in a manner generally parallel to centerline 51. The aforementioned motion of the middle displacing rods and stabilizing rods causes a rightward sideways movement of the middle portion $B_m$ of the berry bush, while the front $B_f$ and rear $B_r$ portions of the berry bush are stabilized by the opposing movement of the stabilizing rods of the front and rear stabilizing means 42, 46 in a manner described previously.

Further counterclockwise 90° rotation of the crankshaft 85 returns the displacing and stabilizing assembly 40 to the first position shown in FIGS. 6 through 8. It should be appreciated that during movement of the displacing and stabilizing assembly 40 through the first, second and third positions and around again to the first position, the middle portion $B_m$ of the berry bush within enclosure 37 is moved from side-to-side by the middle displacing rods 52, while the front and rear portions of the bush are stabilized by the front and rear stabilizing rods 52. This not only reduces the side-to-side movement of the berry bush forward and rearward of the harvester enclosure 37, but it also imparts an improved dislodging action to the middle portion $B_m$ of the bush by the side-to-side movement of the displacing rods 52. This is due to the fact that the side-to-side movement of the middle portion $B_m$ of the bush is more abrupt when its forward and rearward ends are being stabilized and are not permitted to move with the middle portion. Thus, in contrast to conventional harvesters which "beat" or "slap" at the bushes to dislodge the berries, the displacing and stabilizing rods of the harvester of the present invention holds the bush snugly but gives it an abrupt side-to-side shaking action.

In a preferred embodiment, the front and rearward stabilizing rods 52 travel through a smaller arc than do the middle displacing rods 52. This is due to the fact that the front and rear rods are primarily stabilizers, whereas the middle rods must ensure a sufficient side-to-side motion of the bushes to cause the ripe berries to be dislodged. To cause the middle displacing rods 52 to travel through a greater arcuate path, pivot connectors 105, 105' (FIG. 6) of the forward ends of tertiary drive rods 102, 102' are located radially outward from the upstanding rotational axes 71 of the front support posts 50, 50' at a greater distance than are pivot connectors 106, 106' from the upstanding rotational axes 71 of the middle support posts 50. Thus, the rotation of front posts 50 causes the middle posts 50 to rotate through a greater arc than do the front posts. The rotational arc of the middle posts relative to the forward posts is made adjustable by a number of vertical openings (not shown) located longitudinally along the extension bars 104, 108 and which are adapted to engage the pivot connectors 105, 106 therein.

As mentioned previously, the support posts 50 are pivotally mounted to the upper, lower laterally extending sleeves 70 as shown in FIGS. 15 and 16. It has been found that during a harvesting season, the width of a typical berry bush tends to decrease in accordance with the number of times the bush has been picked because the bush is compacted somewhat by the stabilizing and displacing assembly 40. In order to maintain the displacing and stabilizing rods in close engagement with the berry bush throughout its side-to-side movement, the support posts 50 are adjustable slidably inward and outward by the upper, lower manual handcranks 62. In the present invention, this transverse repositioning of the support posts 50 has little effect upon either the predetermined arc of rotation of the support posts 50 and displacing and stabilizing rods 52, or upon the angular positions of the stabilizing and displacing rods 52 discussed previously herein. This ability to transversely adjust the positions of the displacing and stabilizing assembly 40 without affecting the rotational path or angular positions of the support posts and rods is achieved by the fact that, unlike conventional beater assembly drive mechanisms, in the harvester of the present invention the left and right sides of the displacing and stabilizing assembly 40 are not cross-connected. That is, in the harvester 20, the only common connection of the left and right portions of the stabilizing and displacing assembly 40, is at the crank shaft 85 (FIG. 6). Thus, for example, when the left and right support posts 50 are adjusted inwardly to accommodate a narrower row of bushes, and in a manner that the support posts 50 on each side remain in-line at equal distances from centerline 51, there is no need to readjust the drive linkages to maintain the desired arc of oscillation of the support posts 50 and the relative angular positions of the displacing and stabilizing rods 52.

In order to permit transverse movement of the left and right sides of the displacing and stabilizing assembly 40, the rear ends of the primary drive rods 90 (FIG. 6) are coupled to the outer shaft portions 88 of the crank shaft 85 by means of conventional self aligning pillow block bearings (not shown). The pillow block bearings not only permit rotation of the primary drive rod 90 about crank shaft 85, they also permit a small amount of transverse movement of the forward ends of the primary drive rods 90. This permits the forward ends of the primary drive rods 90 to move somewhat transversely inwardly or outwardly when the left and right portions of the displacing and stabilizing assembly 40 are moved by the handcrank 62.

Figure 17:
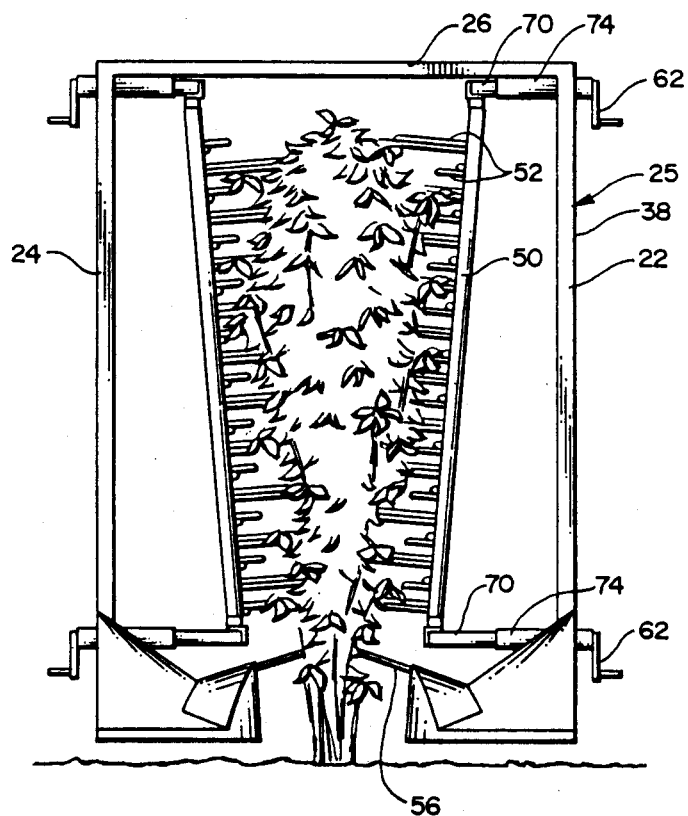
FIG. 17 is a front view similar to FIGS. 15 and 16, and showing the bottom portions of the left and right support posts and the stabilizing and displacing rods at a selected closer transverse distance than the top portions to accommodate a berry bush having a greater top diameter than bottom diameter.

In carrying out the present invention, berry bushes having different widths either at the top or at the bottom are accommodated by top and bottom ends of the support posts 50 being independently adjustable by the handcrank 62. For example, in the event the width of the bottom of the bush is less than the width at the top of the bush, as shown in FIG. 17, the lower ends of the support posts 50 may be adjusted inwardly relative to the upper ends of the support posts by the handcranks 62.

In another exemplary embodiment of the present invention shown more clearly in FIGS. 5 and 8, the flexible displacing and stabilizing rods 52 are mounted to the support posts 50 by means of the rigid elongated holder tubes 78. The holders 78 are mounted to the inward sides 80 (FIG. 5) of the support posts 50 so that the entire length of the rods 52 remain closely engaged to the bush. By remaining in close engagement with the bush during its side-to-side movement, any "slapping" action against the bush is eliminated and impact damage to the bush is reduced. This "slapping" action occurs in conventional harvesters when the beater elements move from a first position spaced away from the bush to a second location in engagement with the bush.

Figure 14:
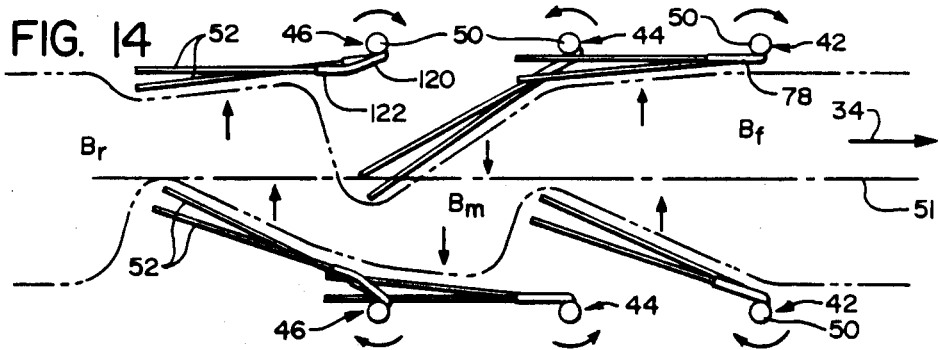
FIG. 14 is a top view of the stabilizing and displacing rods in the third position.

Another feature of the rear holders 118 of the present exemplary embodiment is their configuration which allows the middle displacing rods to pivot to a position their maximum outward location as shown in FIGS. 8 and 14. This is permitted by the fact that the holders 78 of the rear stabilizing means 46 have a somewhat bended configuration so that their inner end portions 120 (FIG. 8) extend primarily rearward and somewhat inward, while their outer end portions 122 extend rearward. This configuration allows the rear support posts 50 to be positioned transversely outward relative to the positions of the middle support posts 50 while maintaining the positions of the rear stabilizing rods 52 relative to the front and middle rods 52. Thus, the outward positions of the rear support posts 50 allow the middle displacing rods 50 to move outwardly to a position where they are parallel to centerline 51 and without interference from the rear support posts 50.

Figure 18:
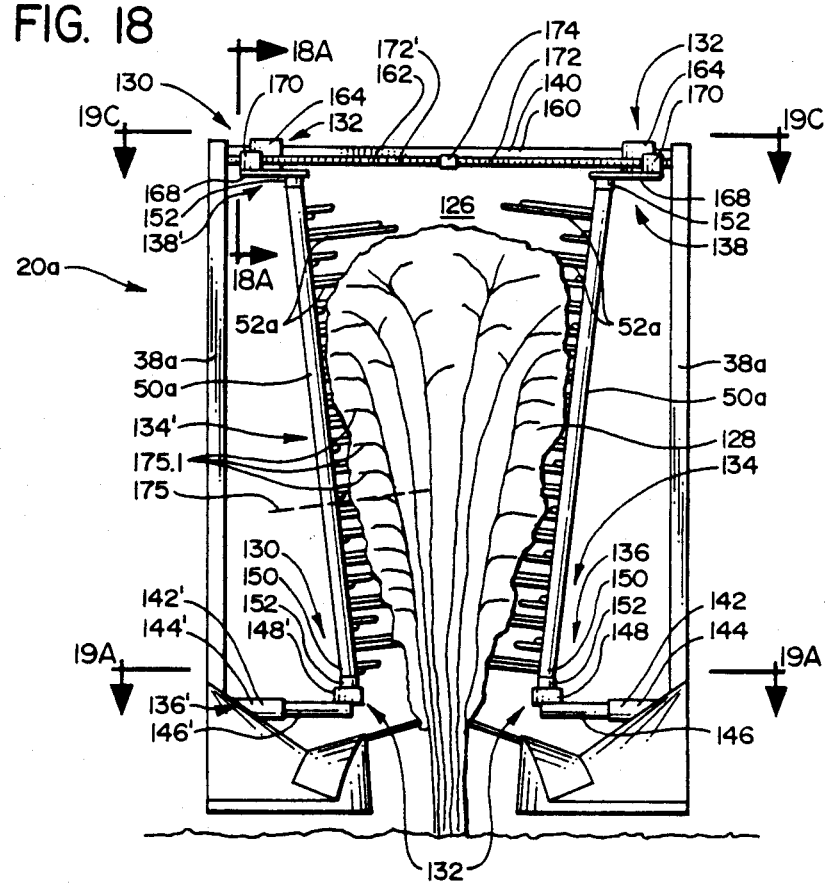
FIG. 18 is a front elevation view of a harvester showing a wheeled chassis, harvesting enclosure and the support frame, mounting units, and harvesting units of the present invention.
Figure 19A:
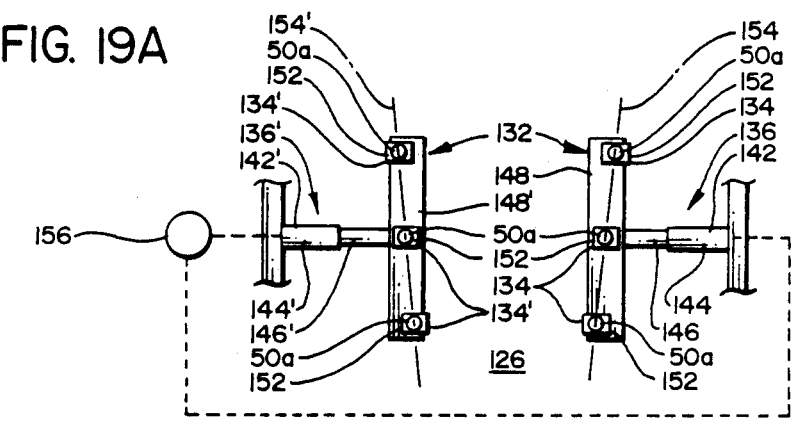
FIG. 19A is a plan view of the lower mounting means of the invention of FIG. 18 taken along the plane 19A.
Figure 19B:
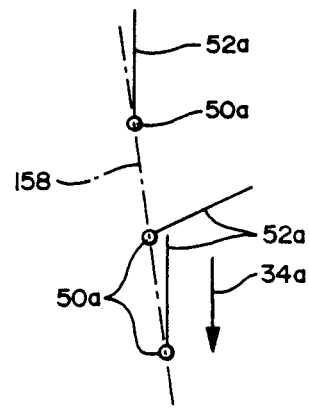
FIG. 19B is a schematic diagram showing a plan view of several vertical support posts having laterally extending beater rods with the posts aligned along a staggering axis of the invention.
Figure 19C:
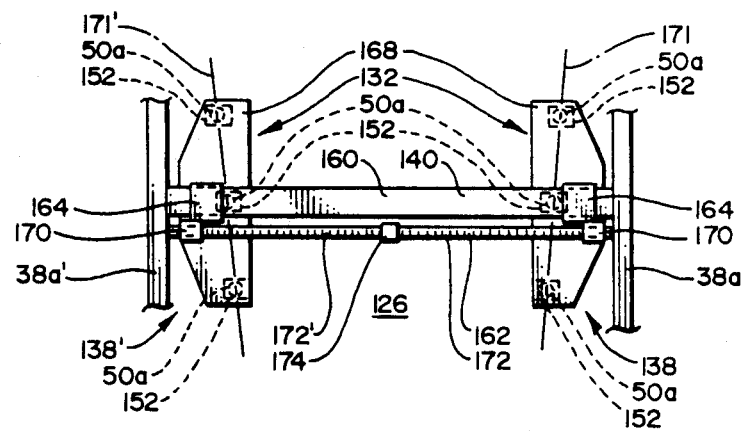
FIG. 19C is a top plan view of the upper mounting means of the present invention of FIG. 18 taken along the plane 19C.

FIGS. 18 to 19C, illustrate an added embodiment of the harvesting support post mounting and positioning components 70, 74, and 62, which, like the previous embodiment, is directed at conforming precisely a transverse profile of a crop engaging area in a harvester to the plants themsleves. For ease of illustration, like members in the preferred embodiment and the previous embodiment will be given like numerals with the suffix "a" designating the components of the added embodiment, this embodiment being compared to the first embodiment.

Support posts 50a that carry the beater rods 52a (FIG. 18), which define a crop receiving area 126 that conforms quite closely to the configuration of individual plants 128 in a row of crops, remain the same as in the previous embodiment. In terms of differences, while the earlier embodiment mounted individual support posts 50 on individual transversely slideable sleeves 70 which are actuated by end cranks 62, the added embodiment mounts support posts 50a on post positioning means 130. For the independent transverse positioning of upper and lower ends of the posts, as well as rearward, outward staggering, which helps to prevent clashing of the rods 52a of separate posts 50a (as described below), the post positioning means 130, by use of post positioning and staggering means 132 fixed to the left and right sidewalls 38a and 38a' of the machine 20a, group one or more of the posts 50a in left and right banks 134, 134', respectively, of posts 50a. The banks 134 and 134' are positioned on either side of the row of plants 128 defining the crop receiving area 126 therebetween. The positioning means 130 comprises left and right lower units 136, 136' and upper units 138, 138', each comprising its positioning and staggering 132 means, which is supported by support means 140.

To begin with the lower left and right units 136, 136', for support and independent transverse positioning, each of the lower units 136, 136', is supported by its support means 140, this being left and right hydraulic adjustment means 142, 142', which comprises two cylinders 144, 144', which are fixed to their related side walls 38a, 38a', hydraulic arms 146, 146', slideably mounted for lateral movement in their related cylinders 144, 144', perpendicularly fixed to a related one of two longitudinally disposed lower staggering members 148, 148', which function as the staggering means 132. To mount the individual posts 50a of the banks 134, 134', in rearward and outward staggering fashion and for the described pivoting of the posts 50a and free rotation of the posts 50a about a lower end 150 of each post 50a in the plane of the drawing, a plurality of brackets 152 are mounted on an upper surface of the staggering members 148, 148', along rearwardly and outwardly directed lower staggering axes 154, 154', in which are placed the lower ends 150 of the posts 50a. Because considerable reaction forces are generated by the reciprocation of the beater rods 52a, the hydraulic adjustment means 142, 142', staggering members 148, 148', and brackets 152 are fashioned to support the banks 134, 134', firmly notwithstanding such reactions, so that the banks 134, 134', may be positioned at selective transverse locations inwardly and outwardly on the plane of the drawing. For positioning and adjustment of lower coordinating units 136, 136', including remote control of such adjustment, each hydraulic adjustment means 142, 142', connects to a related one of two, or as shown in FIG. 19a, the same, adjustment drive motor 156.

With reference to FIG. 8 which shows a plan view of six posts 50 in the machine 20 lined up in two longitudinally directed rows of three posts 50 with their related beater rods 52 shown in various rotational position, as mentioned previously, the outward and rearward staggering of the posts 50a helps to prevent the rods 52a of several posts 50a from clashing with one another. FIG. 19b shows a row of posts 50a which is similar to the row of posts 50 of FIG. 8, but with outward rearward staggering of the posts 50a along a staggering axis 158 which is obliquely disposed with respect to a forward axis 34a with the rods 52a, when in a neutral position, being aligned parallel to the axis 34a.

Figure 18A:
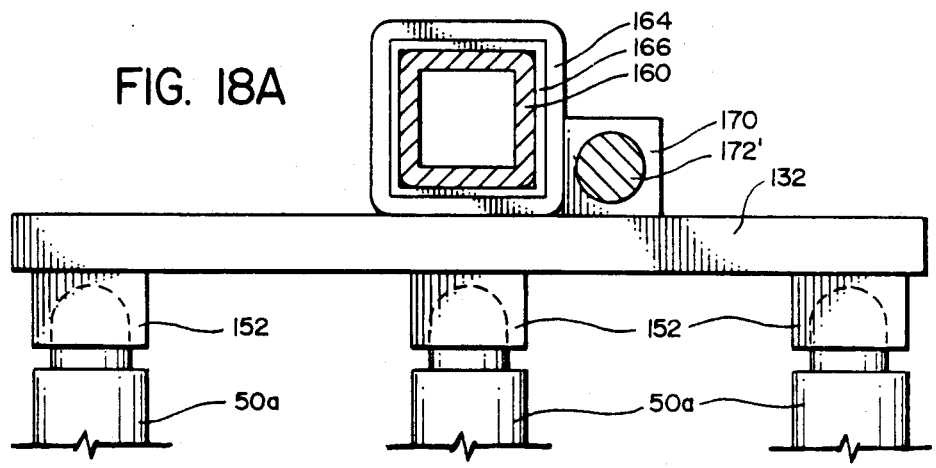
FIG. 18A is a detailed end view of the upper mounting means of the invention of FIG. 18 taken along the plane 18A.

To describe the upper units 138, 138', the support means 140 which is an upper beam 160 transversely disposed across the top of the machine 20a over the hydraulic adjustment means 142, 142', fixed to the sidewalls 38a, supports the upper ends of the banks 134, 134', of posts 50a, allowing the banks 134, 134', to move slideably thereupon for independent transverse positioning of the upper ends of the banks 134, 134'. To accomplish this, each upper unit 138, 138', slideably mounts to the upper beam 160 and operably connects to an adjustment drive thread 162, in effect an Acme thread which enables the banks 134, and 134', to be driven back and forth transversely. In terms of structure, the upper units 138, 138', each comprises: a related one of two slideable mounts 164 (best seen in FIG. 18a) having slide bearings 166 in contact with the beam 160;

upper staggering members 168 and driveably mounts 170 connected to the upper staggering members 168 with threadable bores that threadably engage the thread 162 to drive the upper units 138, 138', back and forth transversely. A plurality of the brackets 152 are connected to the upper staggering platforms 168, these brackets being similar to those used with the lower units 136, 136', the brackets 152 are arranged along outwardly and rearwardly directed staggering axis 170, 170' as shown. The left and right upper units 138, 138', are driven by a related one of two independent threads, or a single thread 162, as shown, the single thread 162 being divided from its middle into a left-handed thread 172 and a right handed thread 172', so that rotation of the entire thread 62 about its transverse axis displaces the two upper units 138, 138', equal distances on either side from a central location 174 at any time, or other threading arrangements are possible providing the upper units 138, 138', with other patterns of displacement.

Several varieties of berry plants have an "hour-glass" profile, which means that the sides of the plants, as shown in FIG. 18, are oblique from the vertical. While the prior art harvesters do not hold the beater elements in precise alignment with the hour-glass configuration of the plant, independent transverse positioning of the upper and lower ends of the posts 50 and 50a, which is disclosed in the previous embodiment and in the added embodiment, provides such precise alignment.

Assuming that, unlike the rods 52a in FIG. 18, the beater rods are disposed parallel to the ground, that is, that the posts that hold the beater rods are vertical, the beater rods will travel in a plane which is aligned disadvantageously with a plane 175 (shown in FIG. 18) in which lateral fruit spurs 175.1 are located, thereby breaking many of the fruit spurs 175.1 which represent new growth. Assuming that the beater rods are positioned precisely at an oblique angle to the ground, as shown in FIG. 18, bringing the plane which the beaters travel along into parallel alignment with the plane 175, many of the lateral spurs 175.1 are saved, thereby enhancing the harvesting yield.

Figure 20A:
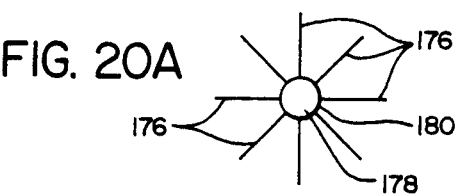
FIG. 20A is a schematic plan view of a cluster of beater rods attached to a central support post.
Figure 20B:
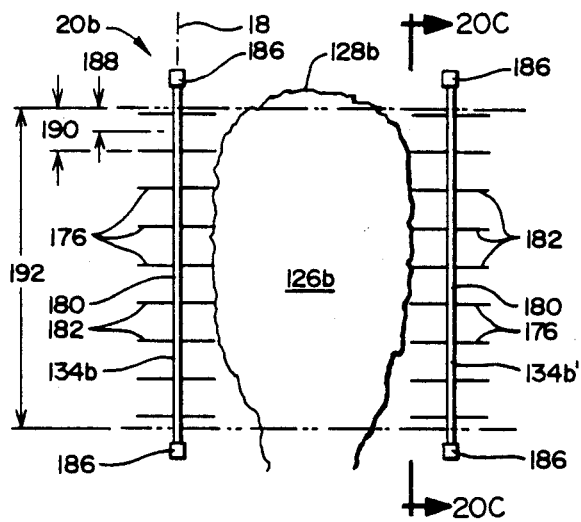
FIG. 20B is a schematic front elevation view of a pair of support posts with tiers of beater rods attached defining a crop receiving area therebetween.
Figure 20C:
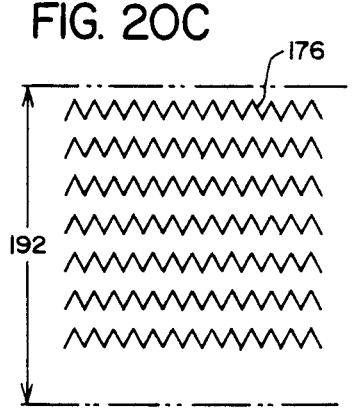
FIG. 20C is a schematic view from the side taken along the plane 20C of FIG. 20B representing the paths of the beater rods of FIG. 20B as the rods reciprocate vertically and rotate about the posts.

While the added embodiment is shown being used with a method of reciprocating the beater rods 52a wherein the rods 52a reciprocate in partial rotation through a limited increment of rotation, the disclosed method and apparatus for mounting the banks 134, 134' is also usable with a harvesting method that reciprocates beater rods as shown in FIGS. 20a-c, and 21a-b. For ease of comparing these figures to the embodiment just discussed, like items will be given like numeral designations, the suffix "b" being added in these last figures. Banks 134b and 134b' are mounted generally vertically in a machine 20b to define therebetween a crop receiving area 126b through which crops comprising individual plants 128b pass, as shown in FIG. 20b. As best shown in FIG. 20a which is a plan top-plan view, a plurality of beater rods 176 are grouped, in a fashion like spokes of a wheel, intersecting at 178 where the rods 176 are attached to a vertical support post 180, the rods 176 being mounted in tiers 182, with the post 180 being allowed to freely rotate about its vertical axis 18 on top and bottom mounting means 186. Then, as the plants 128 move rearwardly through the machine 20b in the crop receiving area 126b the individual rods 176 are caused to rotate by the plants 128 while the posts 180 and the rods 176 are driven up and down for a reciprocation distance 188 which is a fraction of a spacing distance 190 between the tiers 182, so as to shake the food product from the plants 128b (the banks 134b, 134b' operating in a vertically spaced zone of action 192). As shown in FIG. 20c, a schematic diagram viewed from the side as seen along the plane 20c of FIG. 20B, representing a path of tips of the rods 176 as they reciprocate vertically and as they rotate on the posts 50b, the zones of reciprocation of the tips of the rods 176 are each straight, so that some elevations of the plants 128b do not encounter the vibrating rods 176 i.e., there are gaps in plant coverage. Accordingly, some fruit is missed during harvesting.

Figure 21A:
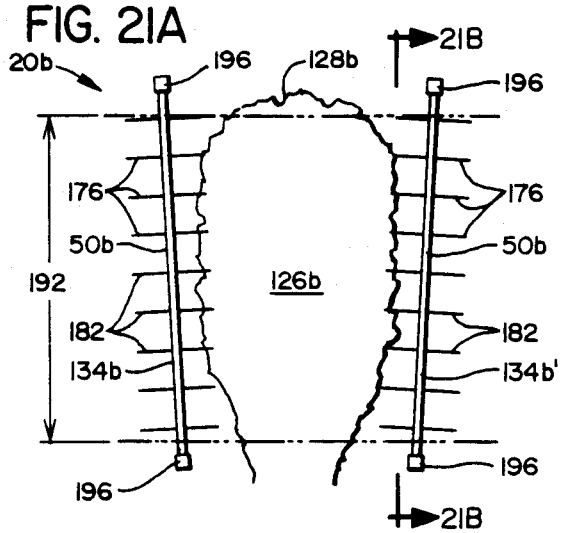
FIG. 21A is a view similar to FIG. 20B wherein the rods are angularly rotated in accordance with the present invention.
Figure 21B:
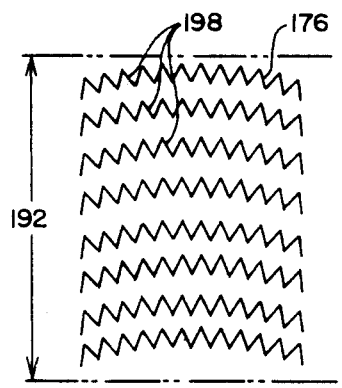
FIG. 21B is a schematic view like FIG. 20C with the rods and posts being obliquely oriented as shown in FIG. 21A.

However, by using independently transversely positionable upper and lower mounting means 196 in accordance with the present invention to mount the banks 134b, 134b', the posts 50b can be slightly angularly rotated as shown in FIG. 21a, in the plane of the drawing. With this oblique orientation of the post 50b, as the rods 176 rotate about the posts 50b and vertically reciprocate, as shown in FIG. 21b (which is a view similar to FIG. 20c), the tips of the rods 176 travel along upwardly curved paths 198, which being upwardly curved cover all elevations of the plants 128b within the zone of action 192, whereby all levels of the plants 128b are covered by the shaking action of the rods 176. Hence, more fruit is retrieved.

What is claimed is:

1. A harvesting apparatus adapted to travel along a crop row and harvest a product from the crop row, said apparatus comprising:
   a. a mobile frame having a crop receiving region through which a crop row passes during a harvesting operation;
   b. a pair of first and second crop harvesting units positioned on opposite sides of said crop receiving region, each unit comprising:
      i. a generally vertically aligned post means mounted for rotation about a vertical axis of said post means;
      ii. harvesting rod means mounted to and extending generally laterally from said post means;
   c. a first and second mounting means by which said first and second harvesting units are, respectively, mounted to said support frame, each of said mounting means being laterally adjustable in that upper and lower portions of each of said post means can independently be moved laterally toward and away from said crop receiving region, whereby angular orientation and lateral spacing of each of said post means can be independently controlled.

2. The apparatus as recited in claim 1, wherein each of said vertical posts means is mounted for limited back and forth rotational movement about its vertical axis, and there is drive means to cause back and forth movement of each of said post means, said rod means being beater rod means which move laterally into engagement with the crop and laterally away therefrom.

3. The apparatus as recited in claim 2, wherein said drive mans is adjustable whereby angular movement of said post means can be controlled for greater or lesser increments of rotational travel of said post means.

4. The apparatus as recited in claim 3, wherein each of said mountings means comprises upper and lower mounting means, said upper mounting means engaging an upper portion of its related post means, and being laterally adjustable to move the upper end of its related post means inwardly and outwardly from said crop receiving region, said lower mounting means engaging a lower end of its related post means and being laterally adjustable to move a lower portion of its related post means laterally toward and away from said crop receiving region independently of said upper mounting means.

5. The apparatus as recited in claim 4, wherein said lower mounting means comprises hydraulic jack means.

6. The apparatus as recited in claim 5, wherein said upper mounting means comprises threaded actuating means engaging upper end of each of said post means in a manner that rotation of said threaded actuating means causes inward and outward lateral movement of the upper end of both of said post means.

7. The apparatus as recited in claim 1, wherein each of said mounting means comprises upper and lower mounting means, said upper mounting means engaging an upper portion of its related post means, and being laterally adjustable to move the upper end of its related post means inwardly and outwardly from said crop receiving region, said lower mounting means engaging a lower end of its related post means and being laterally adjustable to move a lower portion of its related post means laterally toward and away from said crop receiving region independently of said upper mounting means.

8. The apparatus of claim 7, wherein said lower mounting means comprises hydraulic jack means.

9. The apparatus as recited in claim 8, wherein said upper mounting means comprises threaded actuating means engaging upper ends of each of said post means in a manner that rotation of said threaded actuating means causes inward and outward lateral movements of the upper ends of both of said post means.

10. The apparatus as recited in claim 7, wherein said upper mounting means comprises threaded actuating means engaging upper ends of each of said post means in a manner that rotation of said threaded actuating means causes inward and outward lateral movements of the upper ends of both of said post means.

11. A method of operating harvesting apparatus adapted to travel along a crop row and harvest a product from the crop row, where said apparatus comprises:
  a. a mobile support frame having a crop receiving region through which a crop row passes during a harvesting operation;
  b. a pair of first and second crop harvesting units positioned on opposite sides of said crop receiving region, each unit comprising:
    i. a generally vertically aligned post means mounted for rotation about a vertical axis of said post means;
    ii. harvesting rod means mounted to and extending generally laterally from said post means; said method comprising:
  mounting said first and second harvesting units respectively, to said support frame and laterally adjusting said harvesting units in a manner that upper and lower portions of each of said post means is independently moved laterally toward and away from said crop receiving region, whereby angular orientation and lateral spacing of each of said post means can be independently controlled.

12. The method as recited in claim 11, wherein each of said vertical post means is moved in limited back and forth rotational movement about its vertical axis, in a manner that said rod means move laterally into engagement with the crop and laterally away therefrom.

13. The method as recited in claim 12, wherein each of said post means is mounted by upper and lower mounting means, said method further comprising moving an upper end of each post means selectively inwardly and outwardly from said crop receiving region, and moving a lower end of each post means selectively toward and away from said crop receiving region independently of said upper end.

* * * * *